(12) United States Patent
Shimojo

(10) Patent No.: US 8,206,229 B2
(45) Date of Patent: Jun. 26, 2012

(54) ILLUSION GENERATING SYSTEM

(75) Inventor: Shinsuke Shimojo, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 443 days.

(21) Appl. No.: 11/851,497

(22) Filed: Sep. 7, 2007

(65) Prior Publication Data
US 2008/0064513 A1    Mar. 13, 2008

Related U.S. Application Data

(60) Provisional application No. 60/842,820, filed on Sep. 7, 2006.

(51) Int. Cl.
*A63G 31/02*    (2006.01)
(52) U.S. Cl. .......................................................... 472/57
(58) Field of Classification Search ...................... 472/57
See application file for complete search history.

(56) References Cited

U.S. PATENT DOCUMENTS

| | | | | |
|---|---|---|---|---|
| 1,747,556 A * | 2/1930 | Price | ................................ | 40/431 |
| 4,250,537 A * | 2/1981 | Roegner et al. | .................. | 362/86 |
| 4,463,410 A * | 7/1984 | Mori | ............................... | 362/20 |
| 5,295,056 A * | 3/1994 | Peck | ............................. | 362/267 |
| 6,671,005 B1 * | 12/2003 | Pujol et al. | ..................... | 348/771 |
| 6,793,355 B1 * | 9/2004 | Leung | ............................ | 359/850 |
| 7,540,622 B1 * | 6/2009 | Bechtol | ........................... | 362/35 |
| 2002/0101571 A1 * | 8/2002 | Panasewicz et al. | ........... | 353/119 |
| 2003/0103651 A1 * | 6/2003 | Novak | ........................... | 382/106 |

\* cited by examiner

*Primary Examiner* — Gene Kim
*Assistant Examiner* — Michael Dennis
(74) *Attorney, Agent, or Firm* — Lyon & Harr, LLP; Richard T. Lyon

(57) ABSTRACT

The system provides a tristable environment that effects reorientation of horizontal and vertical surfaces at a human scale. The system allows the engagement and disengagement of the effect via movement of the observer without loss of the intensity of the effect. The system also provides a combined vection/motion induced blindness environment at human scale with interactivity available to non-trained participants.

9 Claims, 2 Drawing Sheets

ILLUSION GENERATING SYSTEM

RELATED APPLICATIONS

This application claims priority to U.S. provisional patent application Ser. No. 60/842,820 filed Sep. 7, 2006 and entitled "Art and Science Meet at Illusions; Examples of Installations at Science Museums" which is incorporated in its entirety herein.

FIELD OF THE INVENTION

The invention relates generally to a system and method for providing illusions as part of an installation environment.

BACKGROUND OF THE INVENTION

The use of specially constructed rooms and environments to demonstrate optical and perceptual illusions is known in the art. There are a number of attractions that use forced perspective techniques to make an object or person appear farther, closer, larger or smaller than it actually is. These environments fool human visual perception through the use of scaled objects and the correlation between them and the vantage point of the spectator or camera. A disadvantage of such environments is that they are often "monostable", that is, the desired visual effect is only perceived from a single location or a narrow range of adjacent locations. Another disadvantage is a loss of effectiveness when a user has observed the environment from a point that reveals the trick, a return to the monostable point of observation lacks the impact of the original viewing.

Another disadvantage of prior art optical and perceptual illusion environments is the lack of interactivity among participants, particularly among third party visitors. In some cases, employees or actors in an installation are required to provide a certain kind of interactivity with the environment, but it is often desired for lay users of an installation to be able to enjoy features and interactivity among themselves, without guided help.

One type of effect is a reorientation of horizontal, vertical, and level surface perception of a viewer/user. Certain effects have been reported in Howard, I. P. and Childerson, L. (1994) The Contribution Of Motion, The Visual Frame, And The Visual Polarity To Sensations Of Body Tilt. Perception, 23, 753-762; Howard, I. P., Hu, G., Saxe, R. and Zacher, J. E. (2005) Visual Orientation In A Mirror World Tilted 90 Degrees. Perception, 34, 7-15; and Howard, I. P. and Hu, G. (2001) Visually Induced Reorientation Illusions. Perception, 30, 583-600. These prior art approaches require the use of a mirror or some other other optical device for operation. Other approaches have been described in Hudson, T. E., Li, W. X. and Matin, L. (2000) Independent Mechanisms Produce Visually Perceived Eye Level (VPEL) And Perceived Visual Pitch (PVP). Vision Research, 2605-2619; Matin, L. and Li, W. X. (1995) Multimodal Basis For Egocentric Spatial Localization And Orientation. Journal Of Vestibular Research-Equilibrium & Orientation, 5, 499-518; and Matin, L. and Li, W. X. (1992) Mislocalizations Of Visual Elevation And Visual Vertial Induced By Visual Pitch—The Great-Circle Model. Annals of The New York Academy of Sciences 656, 242-265. These manipulations have mainly focused on a limited visual cues (such as bars) and the effects reported been relatively minor.

Another effect is "vection", namely the implied sense of motion of a stationary user based on the actual motion of other objects which is described in Fischer, M. H. & Kornmüller, A. E. (1930) Optkinetish Ausgelöste Bewegungswahrnehmungen Und Optkinetisher Nystagmus. Journal für Psycholige und Neurologie (Leipzig), 41, 273-308.

A third prior art effect is motion induced blindness discussed in Bonneh, Y S, Cooperman, A. and Sagi, D. (2001) Motion-Induced Blindness In Normal Observers. Nature, 411, 798-801.

These techniques have been limited to small objects in scope and have not proven to be applicable in tandem and at a human scale.

SUMMARY

The system provides a tristable environment that effects reorientation of horizontal and vertical surfaces at a human scale. The system allows the engagement and disengagement of the effect via movement of the observer without loss of the intensity of the effect. The system also provides a combined vection/motion induced blindness environment at human scale with interactivity available to non-trained participants.

DETAILED DESCRIPTION

The system provides a robust and repeatable effect in a tristable perception environment and also provides a combined vection/MIB environment.

Tristable Environment

Figure 1:
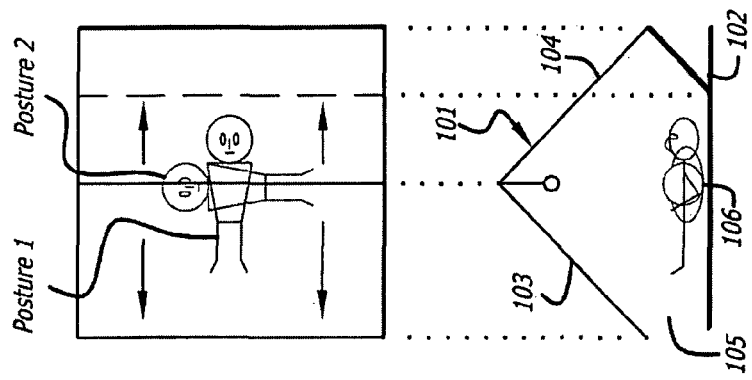
FIG. 1 is a top and side view of an embodiment of a reorientation environment.

FIG. 1 is an illustration of an embodiment of a reorientation environment of the system. FIG. 1 illustrates a top and side view of an installation of an embodiment of the system. Referring first to the side view, the entire structure of a room 101 is tilted except for the floor 102, which is physically horizontal (imagine lifting an ordinary house or room, rotating it in the air and then placing it on the on one of its corners). The angle of the tilt may be within the range of 40-50 degrees. The room size can be human scaled such that two or more observers 106 can be in the room 101 and observe the room interior from a sitting or supine position.

The entrance 105 to the room can be made low or closable to prevent the outside of the room from serving as a visible frame of reference for the observer 106. The interior of the room 101 includes a first surface 103 decorated or finished as a ceiling and a second surface 104 decorated or finished as a wall. The decorating and finishes can include items, such as shelves, frames of painting, pillars etc. that are orthogonal to the tilted frame of reference rather than the physical horizontal and vertical. This can be accomplished by fastening three dimensional items to surfaces 103 and 104. In one embodiment, surfaces 103 and 104 are decorated in such a way that they can be interpreted as either wall or ceiling depending on the user's orientation.

Referring now to the top view of FIG. 1 we observe the three states (tristable positions) of the system. Posture 1 is a viewer 106 orientation that presents one desired optical effect. Viewer 106 in Posture 1 will perceive surface 103 as the ceiling of room 101 and surface 104 as a wall of room 101. The viewer 106 will perceive surface 103 as being directly above the viewer and horizontal to the plane, while perceiving himself to be on a sloped floor, in spite of the fact that the viewer is in fact horizontal. Similarly, at a position 180 degrees from Posture 1 (and not shown in FIG. 1) the user will experience a similar perception, but with surface 104 now appearing as a level ceiling and surface 103 now appearing as an upright wall.

At Posture 2, (or its orthogonal, not shown) viewer 106 will perceive room 101 in its true state and will experience a room turned on its corner, with no false orientation. The same effect takes place if the viewer 106 is sitting upright in room 101.

Figure 2:
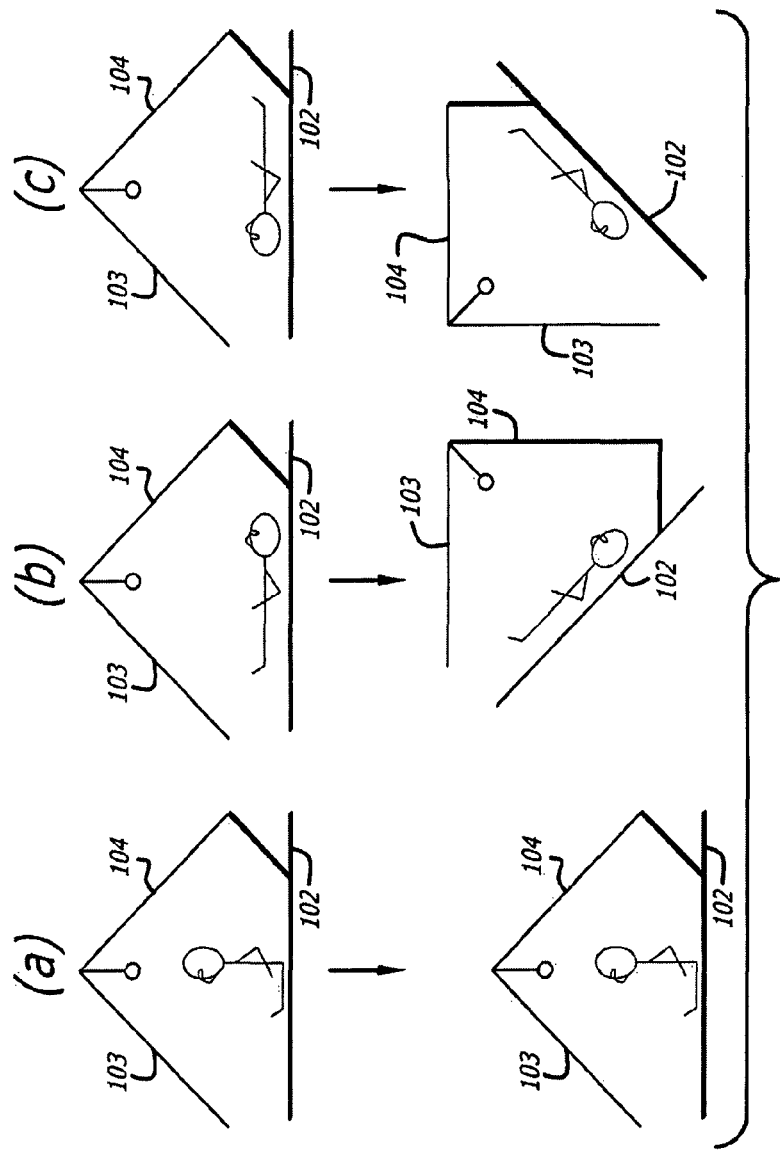
FIG. 2 is a view illustrating the perception effect of the tristable states of the embodiment of FIG. 1.

FIG. 2 illustrates the perception of the viewer in the three tristable locations. When the observer stands or sits in the upright position at position A, nothing happens. Perception of the surrounding space is as it is physically in reality. The floor 102 on which the observer lies is horizontal, and all the other surfaces of the room including the walls and the ceiling (103, 104) appear to tilt properly. When the observer lies flat on the floor as in position B, however, the percept changes dramatically. Now the entire room appears upright and normal, the surface 103 immediately above the observer appears as a horizontal ceiling and the other surface 104 appears as a vertical wall. Meanwhile, the floor 102 appears to tilt and indeed, the observer feels that s(he) is about to slip down on a steep slope. This perceptual switch of frame of reference is instantly noticeable, and the orientation of everything inside the room is judged in accordance with this new frame of reference (defined by the walls and the ceiling), rather than the physical frame. Thus, a surface of water in a glass, a pendulum, a person standing on one foot, a balloon constrained by a string, and a balancing toy all appear to tilt. A ball on a rail (which is slightly tilted with regard to the physical coordinate) may appear to spontaneously roll uphill, etc.

When the user orients himself in the third of the tristable locations as in position C, the surface 104 now appears as the ceiling and surface 103 appears as a vertical wall. In this position the viewer feels that he or she is on a slanted floor 102 with the feet above the head, even though the observer is horizontal.

The system allows observers to freely change their postures in a very natural living room type of environment, to demonstrate how critical the posture as a factor to the illusion. Indeed in supine position, the room typically appears to be precisely upright (not just towards that direction), and it is again very difficult to "correct" the percept by knowledge.

This freedom of posture on the observer's side makes this demonstration particularly suitable for a museum type of setting. The effect occurs particularly when the observer lies along the direction of the tilt, that is, only when the observer's spinal axis is approximately perpendicular to the axis of rotation of the room. When the observer lies along the axis of room rotation, for example, the percept is veridical and very stable. Second, when the supine observer lies in the direction of room tilt, and slowly raises up her(his) head and upper body towards upright posture, the perceptual frame of reference suddenly shifts from the illusory one to the veridical one at one point. Third and most intriguingly, there is a third percept possible when the observer is in the supine position in the direction of rotation, but with the head on the opposite side with regard to the direction of the room rotation.

The tristable states of the system result in a consistently repeatable effect and impression compared to prior art approaches. The immersive environment results in the effect being substantially irresistible even when the user is aware of the true orientation of the room. In fact, in one embodiment of the system, the floor 102 is implemented as a turntable that can rotate a supine viewer from one of the tristable positions to another and the viewer will consistently feel the same strong feeling and impression of the effect as the viewer rotates repeatedly through each position.

Combined Vection/MIB Environment

Figure 3:
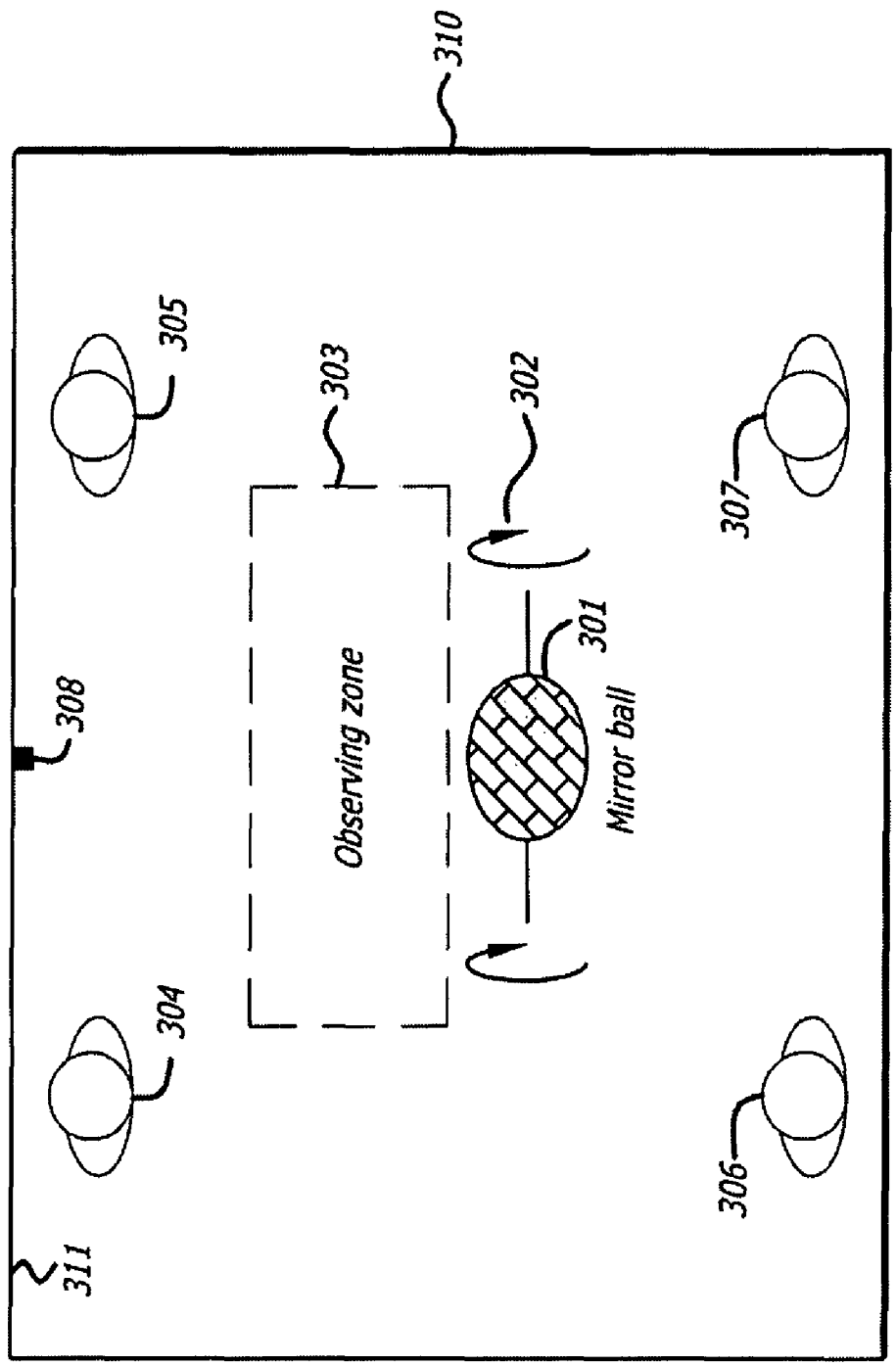
FIG. 3 is a diagram of a combined vection/MIB environment of the system.

Another embodiment of the system provides an environment that combines vection with motion induced blindness effects. The hybrid environment also permits the interactivity in the visual effect by untrained observers in the environment. An example of an embodiment of the system is illustrated in FIG. 3. A mirror ball 301, such as one can often found in a discotheque, is installed with light sources on a ceiling of a room 310 (in one embodiment the mirror ball is ellipsoid-shaped, rather than the typical spherical mirror ball, but a spherical one will work as well). The mirror ball 301 rotates by an electric servo motor whose rotation speed is configured at a relatively low and stable level (e.g. 0.7~1.1 m/sec velocity in the projection onto the front wall 311). In one embodiment the direction of rotation can be selectively reversed via a switch box. A light source (not shown) can be any type of spotlight spotting the mirror ball 301. The number of light sources that is necessary for the demonstration depends on the resulting density of light blobs drifting on the room walls with a wide variety of densities able to provide the desired effect. To avoid shadows the light sources may be placed on the ceiling.

In an alternate embodiment, the mirror ball and light combination may be replaced with a cylinder or ellipsoid having a light disposed therein with openings or transparencies on the surface of the cylinder to allow light to pass through. In one embodiment, the openings are distributed about the cylinder in a pseudo random pattern or non-periodic manner for projection on a wall and/or ceiling surface.

This combined vection/MIB environment demonstrates two different perceptual illusions. The first effect is vection. To experience this, the mirror ball is illuminated and rotated in an axis perpendicular to the observers line of sight so that the reflected light blobs from the mirror ball 301 move generally from top to bottom on the wall or from bottom to top depending on the direction the viewer is facing or the direction of rotation of the mirror ball 301. While the light blobs are in motion, the observer stands still in the central observation area 303 on the floor, and concentrates at the fixation marker 308 on the front wall 311. Typically within 10-15 sec. the observer feels her(him)self start rotating backward (if the optical flow is downward), or rotating forward (if upward), even though the observer is perfectly stable. More strikingly, the entire room 310 appears to rotate as if it were yoked with the observer. When concentrating on the optical flow in the front wall 311, the observer often has a sensation of the observer's own body not just rotating with the room, but also sinking down (or floating up) when the optical flow is upwards (or downwards). At a practical level, the optical flow is created by reflected light, thus nothing heavy or large is physically rotating around the observer.

The second illusion that is provided in the hybrid environment is motion induced blindness (MIB). In MIB, a stationary target surrounded by moving dots seems to vanish, even though the observer knows the target is really there. The system is able to provide for erasure at human scales and is successful in erasing an entire body of human. To experience this effect, the observer needs to have somebody (persons 304, 305) standing very still along the front wall 311. The effect may be stronger in the periphery, but it works in the parafovea or even the fovea as well. The observer should fixate at the marker 308 in the middle of the front wall 311. Typically within 15-20 sec, the person's (304 or 305 or both) body starts fading and disappears partly or entirely to the observer. Even when the person is speaking aloud, but not moving, the person 304 or 305 still appears to vanish, or remains vanished. Often, her(his) shadow remains on the wall or the floor while the body is mostly invisible. When the person 304 or 205 starts moving his head or arm, only that part of the body seems to reappear.

In the system of FIG. 3, untrained participants can enjoy interactive illusions and perceptions. For example, if the are one or more observers 306 and 307 on the opposite wall of wall 311, they can appear and disappear from observers 304 and 305 by changing their area of focus. Each of the parties 304, 305, 306, and 307 can appear and disappear to each other simply by proper positioning and a change of point of concentrated focus. This effect is made possible by the large human scale of the environment, and the axis of rotation of the mirror ball 301.

The environments of FIGS. 1 and 3 can be combined as desired. For example, when the mirror ball with rotation into the observation axis is used in the environment of FIG. 1, the observer may not only feel that they are on a sloped floor, but that they and/or the floor are moving toward or away from the surface in front of them (depending on the direction of rotation of the mirror ball).

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. An illusion generating apparatus for creating a vection and motion-induced blindness environment in a room having surfaces comprising walls, a floor and a ceiling and sized such that a human observer can stand in the room, comprising: a light blob generating device which projects a plurality of light blobs onto the room surfaces and which continuously rotates at prescribed rotation speed about an axis in only a single prescribed direction such that the projected light blobs are in continuous motion at all times on a front wall of the room, wherein said axis is substantially horizontally parallel to the floor of the room and substantially perpendicular to an observer's line of sight whenever the observer is standing in an observation area which is centrally located on the floor of the room and facing the front wall of the room; and a fixation marker statically disposed substantially in the middle of the front wall of the room.

2. The illusion generating apparatus of claim 1, wherein the light blob generating device rotates about said axis in said single prescribed direction such that the projected light blobs move up the front wall of the room.

3. The illusion generating apparatus of claim 1, wherein the light blob generating device rotates about said axis in said single prescribed direction such that the projected light blobs move down the front wall of the room.

4. The illusion generating apparatus of claim 1, wherein the light blob generating device has a substantially ellipsoidal shape.

5. The illusion generating apparatus of claim 1, wherein the light blob generating device has a substantially spherical shape.

6. The illusion generating apparatus of claim 1, wherein the light blob generating device has a substantially cylindrical shape.

7. The illusion generating apparatus of claim 1, wherein the rotation speed of the light blob generating device about said axis is within a range that causes the projected light blobs to move on at least the front wall of the room between 0.7 and 1.1 meters per second.

8. The illusion generating apparatus of claim 1, wherein the motion-induced blindness aspects of the environment are facilitated by the inclusion of at least one area on the floor of the room adjacent the front wall of the room where a person stands.

9. The illusion generating apparatus of claim 1, wherein the projected light blobs are in motion on a rear wall of the room, and wherein the motion-induced blindness aspects of the environment are facilitated by the inclusion of at least one area on the floor of the room adjacent the back wall of the room where a person stands.

* * * * *